US012189715B2

(12) United States Patent
Gerdes et al.

(10) Patent No.: US 12,189,715 B2
(45) Date of Patent: Jan. 7, 2025

(54) SIGNAL SYNTHESIZER DATA PUMP SYSTEM

(71) Applicant: Oracle International Corporation, Redwood Shores, CA (US)

(72) Inventors: Matthew T. Gerdes, Oakland, CA (US); Guang C. Wang, San Diego, CA (US); Kenny C. Gross, Escondido, CA (US); Timothy David Cline, Gainesville, VA (US)

(73) Assignee: Oracle International Corporation, Redwood City, CA (US)

( * ) Notice: Subject to any disclaimer, the term of this patent is extended or adjusted under 35 U.S.C. 154(b) by 895 days.

(21) Appl. No.: 17/334,392

(22) Filed: May 28, 2021

(65) Prior Publication Data

US 2022/0383043 A1 Dec. 1, 2022

(51) Int. Cl.
*G06F 18/214* (2023.01)
*G06F 1/02* (2006.01)
*G06N 3/08* (2023.01)

(52) U.S. Cl.
CPC ............ *G06F 18/214* (2023.01); *G06F 1/022* (2013.01); *G06F 2218/12* (2023.01); *G06N 3/08* (2013.01)

(58) Field of Classification Search
CPC ...................................................... G06F 1/022
See application file for complete search history.

(56) References Cited

U.S. PATENT DOCUMENTS 7,171,586 B1 * 1/2007 Gross .................. G06F 11/3414
714/E11.2
12,093,753 B2 * 9/2024 Walters ................. G06F 16/248
(Continued)

OTHER PUBLICATIONS

T. Masoumi and K. C. Gross, "SimSPRT—II: Monte Carlo Simulation of Sequential Probability Ratio Test Algorithms for Optimal Prognostic Performance," 2016 International Conference on Computational Science and Computational Intelligence (CSCI), Las Vegas, NV, USA, 2016, pp. 496-501. (Year: 2016).*

(Continued)

*Primary Examiner* — Emily E Larocque
*Assistant Examiner* — Markus Anthony Villanueva
(74) *Attorney, Agent, or Firm* — Park, Vaughan, Fleming & Dowler LLP

(57) ABSTRACT

The disclosed system produces synthetic signals for testing machine-learning systems. During operation, the system generates a set of N composite sinusoidal signals, wherein each of the N composite sinusoidal signals is a combination of multiple constituent sinusoidal signals with different periodicities. Next, the system adds time-varying random noise values to each of the N composite sinusoidal signals, wherein a standard deviation of the time-varying random noise values varies over successive time periods. The system also multiplies each of the N composite sinusoidal signals by time-varying amplitude values, wherein the time-varying amplitude values vary over successive time periods. Finally, the system adds time-varying mean values to each of the N composite sinusoidal signals, wherein the time-varying mean values vary over successive time periods. The time-varying random noise values, amplitude values and mean values can be selected through a roll-of-the-die process from a library of values, which are learned from industry-specific signals.

20 Claims, 18 Drawing Sheets
(5 of 18 Drawing Sheet(s) Filed in Color)

(56) References Cited

U.S. PATENT DOCUMENTS

2017/0364477 A1* 12/2017 Thach .................... G06N 3/044
2022/0342990 A1* 10/2022 Zhang ................... G06F 21/562

OTHER PUBLICATIONS

G. C. Wang and K. Gross, "Telemetry Parameter Synthesis System to Support Machine Learning Tuning and Validation," 2018 International Conference on Computational Science and Computational Intelligence (CSCI), Las Vegas, NV, USA, 2018, pp. 941-946, doi: 10.1109/CSCI46756.2018.00184. (Year: 2018).*

M. T. Gerdes, K. Gross, and G. C. Wang, "Unquantize: Overcoming Signal Quantization Effects in IoT Time Series Databases," Advances in Security, Networks, and Internet of Things, Conference paper, Jul. 11, 2021. pp 621-636. (Year: 2021).*

K. C. Gross, K. Baclawski, E. S. Chan, D. Gawlick, A. Ghoneimy and Z. H. Liu, "A supervisory control loop with Prognostics for human-in-the-loop decision support and control applications," 2017 IEEE Conference on Cognitive and Computational Aspects of Situation Management (CogSIMA), May 18, 2017. (Year: 2017).*

G. C. Wang, K. Gross and A. Subramaniam, "ContainerStress: Autonomous Cloud-Node Scoping Framework for Big-Data ML Use Cases," 2019 International Conference on Computational Science and Computational Intelligence (CSCI), Las Vegas, NV, USA, 2019, pp. 1257-1262. (Year: 2019).*

K. Gross and G. C. Wang, "AI Decision Support Prognostics for IoT Asset Health Monitoring, Failure Prediction, Time to Failure," 2019 International Conference on Computational Science and Computational Intelligence (CSCI), Las Vegas, NV, USA, 2019, pp. 244-248. (Year: 2019).*

A. R. More and K. C. Gross, "SimML Framework: Monte Carlo Simulation of Statistical Machine Learning Algorithms for IoT Prognostic Applications," 2016 International Conference on Computational Science and Computational Intelligence (CSCI), Las Vegas, NV, USA, 2016, pp. 174-179. (Year: 2016).*

K. Gross, "MSET2 Overview: "Anomaly Detection and Prediction" Oracle Cloud Autonomous Prognostics," OracleLabs. Aug. 8, 2019. (Year: 2019).*

* cited by examiner

SIGNAL SYNTHESIZER DATA PUMP SYSTEM

BACKGROUND

Field

The disclosed embodiments generally relate to techniques for generating synthetic time-series signals. More specifically, the disclosed embodiments relate to a technique for generating synthetic time-series sensor signals with a realistic stochastic structure to facilitate testing operations for machine-learning systems.

Related Art

Large numbers of sensors are presently being deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the monitored assets.

ML-based prognostic-surveillance techniques typically operate by training an ML model (also referred to as an "inferential model") to learn correlations among time-series signals. The trained ML model is then placed in a surveillance mode where it used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

For these prognostic-surveillance applications, a significant challenge for data scientists is acquiring enough time-series data from executing assets with which to evaluate, tune, optimize, and validate important prognostic functional requirements. These functional requirements can relate to false-alarm and missed-alarm probabilities (FAPs, MAPs), time-to-detect (TTD) metrics for early-warning of incipient anomalies in monitored systems, and overhead compute costs for real-time streaming prognostic applications.

Unfortunately, using this type of time-series data raises a number of concerns, such as: copyright ownership issues that prevent the data from being used by commercial companies; exorbitant fees for using the data; and other restrictions attached to the data. As a consequence, synthetically generated signals are often used in ML research fields instead of real time-series signals. However, commonly used synthetic signals are typically generated through rudimentary techniques, and they consequently lack the complex stochastic structure of real time-series signals. Because of these deficiencies, commonly used synthetic signals cannot be used to effectively train ML models to detect anomalies, which are associated with the stochastic structure of the time-series signals.

Hence, what is needed is a technique for generating synthetic time-series signals for ML applications that exhibit a realistic stochastic structure.

SUMMARY

The disclosed embodiments relate to a system that produces synthetic signals for testing machine-learning systems. During operation, the system generates a set of N composite sinusoidal signals, wherein each of the N composite sinusoidal signals is an additive combination of multiple constituent sinusoidal signals with different periodicities. Next, the system adds time-varying random noise values to each of the N composite sinusoidal signals, wherein a standard deviation of the time-varying random noise values varies over successive time periods. The system also multiplies each of the N composite sinusoidal signals by time-varying amplitude values, wherein the time-varying amplitude values vary over successive time periods. Finally, the system adds time-varying mean values to each of the N composite sinusoidal signals, wherein the time-varying mean values vary over successive time periods.

In some embodiments, while generating the N composite sinusoidal signals, the system receives composite signal parameters from a user, wherein the composite signal parameters specify a desired number of composite sinusoidal signals N, and periodicities for the constituent sinusoidal signals that are combined to produce the N composite sinusoidal signals. The system then uses the composite signal parameters to generate the N composite sinusoidal signals.

In some embodiments, the time-varying random noise values, amplitude values and mean values are selected through a roll-of-the-die process from a library of common values, which are systematically learned from industry-specific signals. For a variety of industries (including utilities, oil & gas, commercial aviation, smart manufacturing, data centers, defense, and medicine), we can gather and store in libraries typical values from that industry for means, noise ratios (STDs), and dynamics that get reflected in the envelope of sinusoidal amplitudes and periods. We can then have the "roll-of-the-die" selections come from libraries of industry-specific values. This can be accomplished by inferring typical ranges of dynamic and stochastic parameters to span the real parametric content for that industry through a Fourier decomposition and reconstruction technique that operates on typical signals from each industry. During this process, the system first decomposes and learns the dynamic components of the signals. The system then subtracts those off real signals to learn the stochastic components, and at the same time learns the mean ranges for the signals, and constructs libraries of industry specific parameters with which the signal synthesizer builds libraries of typical parameter ranges. In this way, the roll-of-the-die selections: (1) produce signals that are not identical (as a naive signal simulator would do); and (2) the signals end up having typical signal means, cross-correlations, serial-correlations, and signal-to-noise ratios, as real signals would in specific industries. In this way, our system facilitates stress testing and evaluating ML techniques with signals that are typical for what customer will see in industry-specific assets.

In some embodiments, the system produces the time-varying random noise values for each successive time period. During this process, the system iteratively: uses a roll-of-the-die process to randomly select a standard deviation for the noise value from among n user-specified standard deviation values; generates Gaussian noise with a standard deviation equal to the selected standard deviation; uses a roll-of-the-die process to randomly select a dispersion value from among q user-specified dispersion values; and multiplies the generated Gaussian noise by the selected dispersion value to produce random noise for the time period.

In some embodiments, the system produces the time-varying amplitude values for each successive time period. During this process, the system iteratively: uses a roll-of-the-die process to randomly select an amplitude value from among m user-specified amplitude values; uses a roll-of-the-die process to randomly select a dispersion value from among q user-specified dispersion values; and multiplies the selected amplitude value by the selected dispersion value to produce an amplitude value for the time period.

In some embodiments, the system produces the time-varying mean values for each successive time period. During this process, the system iteratively: uses a roll-of-the-die process to randomly select a mean value from among m user-specified mean values; uses a roll-of-the-die process to randomly select a dispersion value from among q user-specified dispersion values; and multiplies the selected mean value by the selected dispersion value to produce a mean value for the time period.

In some embodiments, the system uses the set of N composite sinusoidal signals to test a machine-learning system that performs prognostic-surveillance operations on a monitored system.

In some embodiments, while testing the machine-learning system, the system forms a training data set from a first section of the set of N composite sinusoidal signals, and also forms a surveillance data set from a second section of the set of N composite sinusoidal signals. Next, during a training mode, the system uses the training data set to train an inferential model. Then, during a surveillance mode, the system uses the trained inferential model to generate estimated values for time-series signals in the surveillance data set based on cross-correlations between time-series signals in the surveillance data set. Next, the system performs pairwise differencing operations between actual values and the estimated values for the time-series signals in the surveillance data set to produce residuals. Finally, the system analyzes the residuals to detect the incipient anomalies in the monitored system.

In some embodiments, while analyzing the residuals, the system performs a sequential probability ratio test (SPRT) on the residuals to produce SPRT alarms, and then detects the incipient anomalies based on the SPRT alarms.

In some embodiments, prior to generating the set of N composite sinusoidal signals, the system receives a set of N time-series sensor signals from a monitored system. Next, the system extracts parameters from the N time-series sensor signals, wherein the extracted parameters can include: (1) signal dynamics parameters, including serial correlations and cross-correlations; (2) stochastic characteristic parameters, such as means, variances, skew parameters, kurtosis parameters, spike characteristics and signal quality characteristics; (3) a standard deviation value range for signal noise; (4) an amplitude value range; and (5) a mean value range. The system then uses the extracted parameters while producing the synthetic signals.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The computer-readable storage medium includes, but is not limited to non-volatile memory and magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
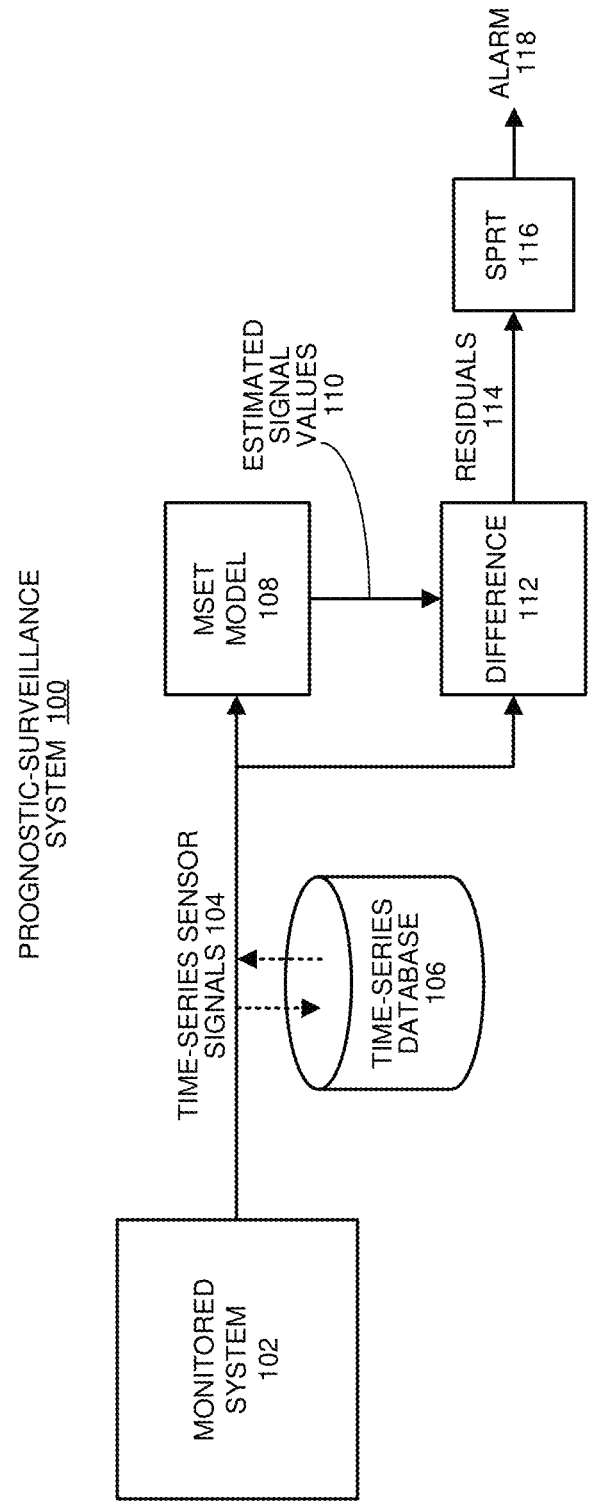
FIG. 1 illustrates an exemplary prognostic-surveillance system in accordance with the disclosed embodiments.

Before describing our synthetic signal generation system further, we first describe a prognostic-surveillance system that can be tested using the synthetic signals produced by the signal generation system. FIG. 1 illustrates an exemplary prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into a multivariate state estimation technique (MSET) pattern-recognition model 108. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators to incipient anomalies, such as impending failures, hopefully with enough lead time so that such problems can be avoided or proactively fixed.

Figure 2:
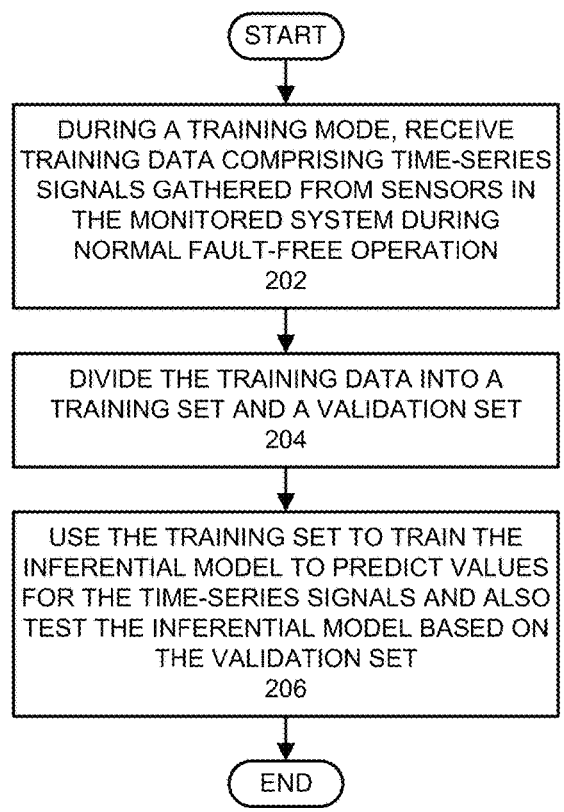
FIG. 2 presents a flow chart illustrating a process for training an inferential model in accordance with the disclosed embodiments.
Figure 3:
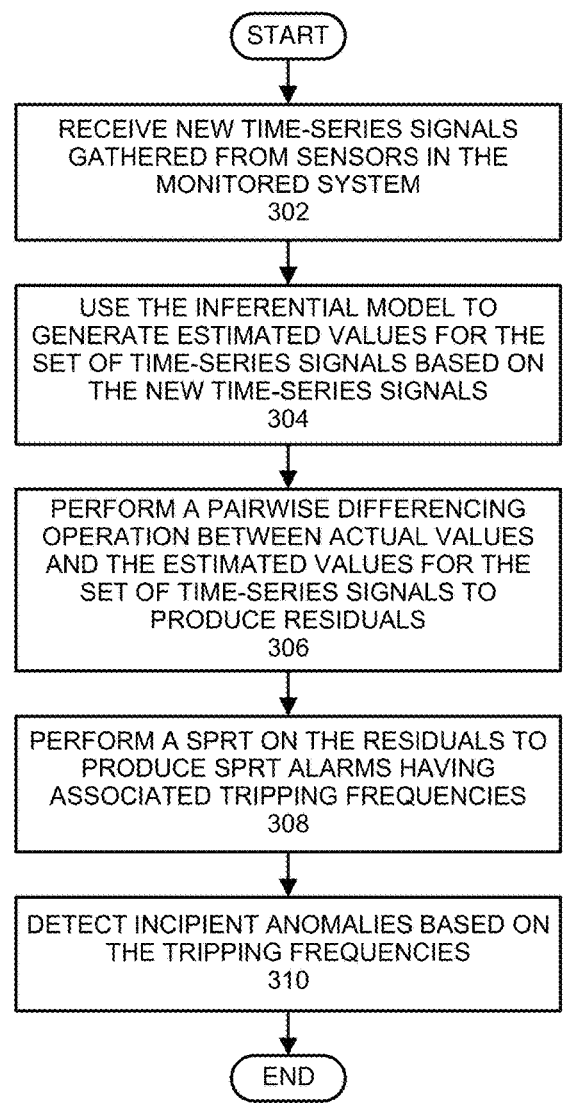
FIG. 3 presents a flow chart illustrating a process for using an inferential model to perform prognostic-surveillance operations in accordance with the disclosed embodiments.

The prognostic surveillance system 100 illustrated in FIG. 1 operates generally as follows. During a training mode, which is illustrated in the flow chart in FIG. 2, the system receives a training set comprising time-series signals gathered from sensors in the monitored system under normal fault-free operation (step 202). Next, the system divides the training data into a training set and a validation set (step 204). The system then trains the inferential model to predict values of the time-series signals based on the training set, and also tests the inferential model based on the validation set (step 206). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Discussion

The disclosed embodiments provide a new signal synthesizer data pump (SSDP) system, which provides a high-volume, high-fidelity source of realistic sensor signals that can be used to evaluate, troubleshoot and improve new ML techniques without having to deal with data privacy issues. This SSDP system makes it possible for users to customize: sampling rates; a number of samples; a number of signals; a periodicity of dynamic content; and signal-to-noise ratios. Additionally, the SSDP system allows the user to control various signal characteristics, such as amplitudes and mean values. It also uses a "random dispersion factor" to distribute signals more widely across a user-defined range.

In this way, the SSDP system can produce synthesized signals, which are statistically indistinguishable from real signals produced by monitored systems in many industries. This makes it possible for researchers to evaluate and tune ML systems to better meet prognostic functional requirements, including achieving desired sensitivities, avoiding false alarms, and minimizing overhead compute costs.

The SSDP system can be used to generate multiple similar data sets by using the above-described "randomized dispersion factor." This dispersion factor can be used to systematically vary: signal to noise ratios (SNRs); signal magnitudes; sampling rates; and degrees of serial correlation. This random dispersion factor makes it possible to thoroughly test an ML technique, not only against one data set, but against a large number of similar data sets that cover all possible permutations and combinations of the signal-characterization parameters that might influence prognostic accuracy, as well as false-alarm and missed-alarm probabilities (FAPs and MAPs).

Moreover, the SSDP system can be used to generate signals that have no disturbances, which can be used as "ground truth" degradation-free data sets for assessing FAPs. It is then possible to systematically insert degradation signatures into these ground truth signals (using a fault-injection capability built into the SSDP system) to accurately assess MAPs against ground truth data sets.

Figure 4A:
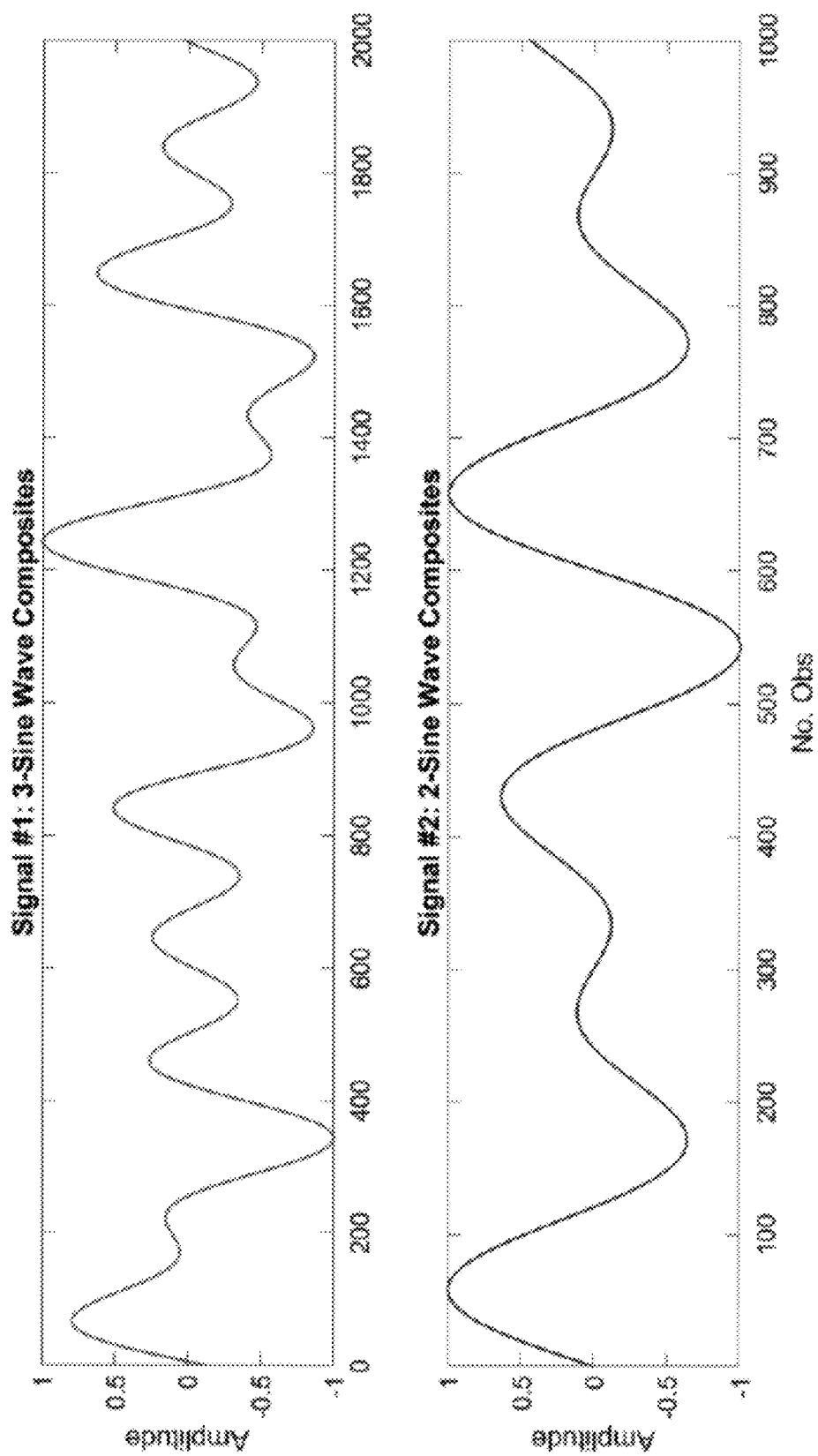
FIG. 4A presents two graphs illustrating standard baseline signals without any additional features in accordance with the disclosed embodiments.
Figure 4B:
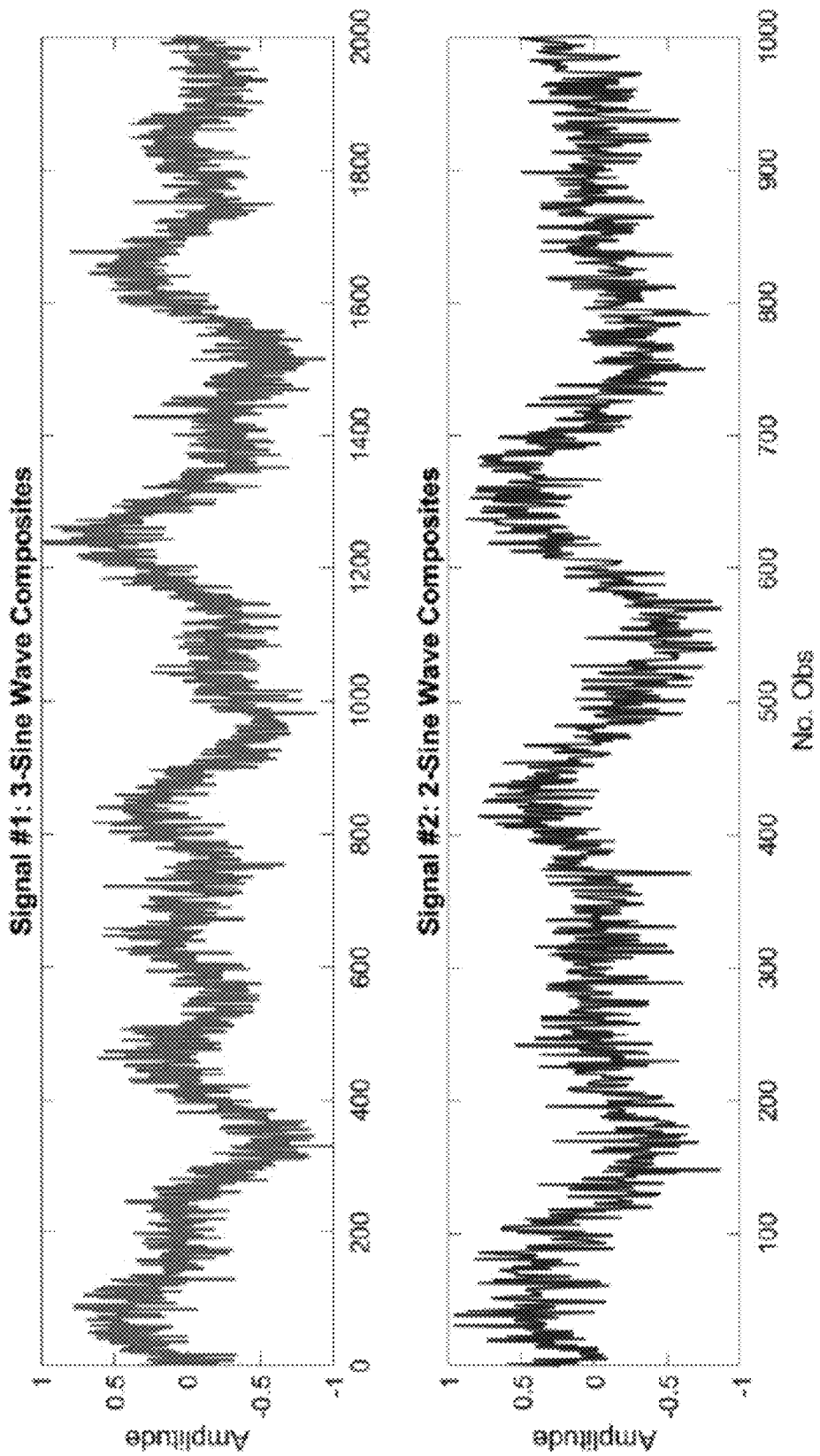
FIG. 4B presents two graphs illustrating noise added to the graphs in FIG. 4A in accordance with the disclosed embodiments.
Figure 4C:
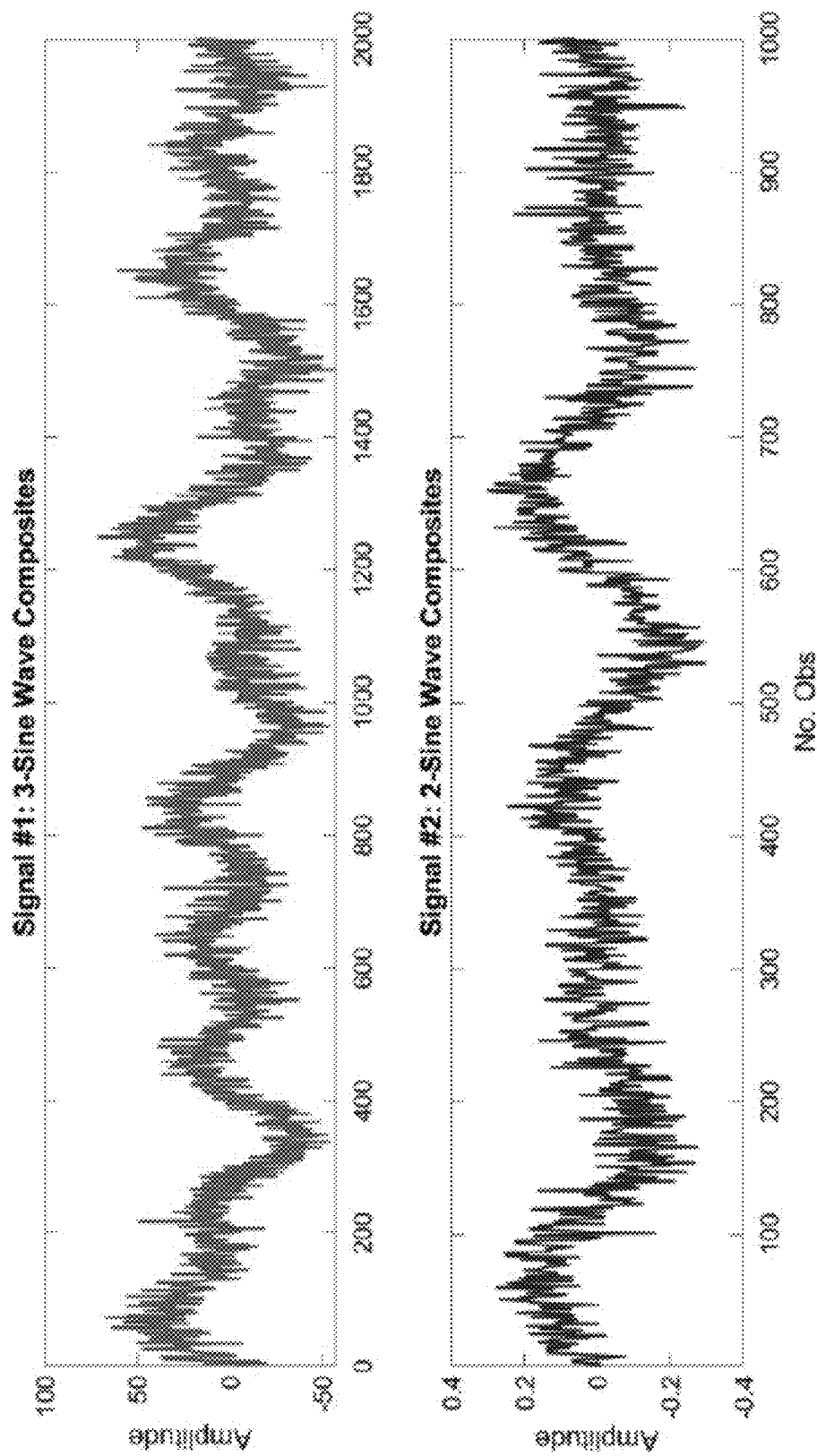
FIG. 4C presents two graphs illustrating the effect of modified amplitude coefficients applied to the graphs in FIG. 4B in accordance with the disclosed embodiments.
Figure 4D:
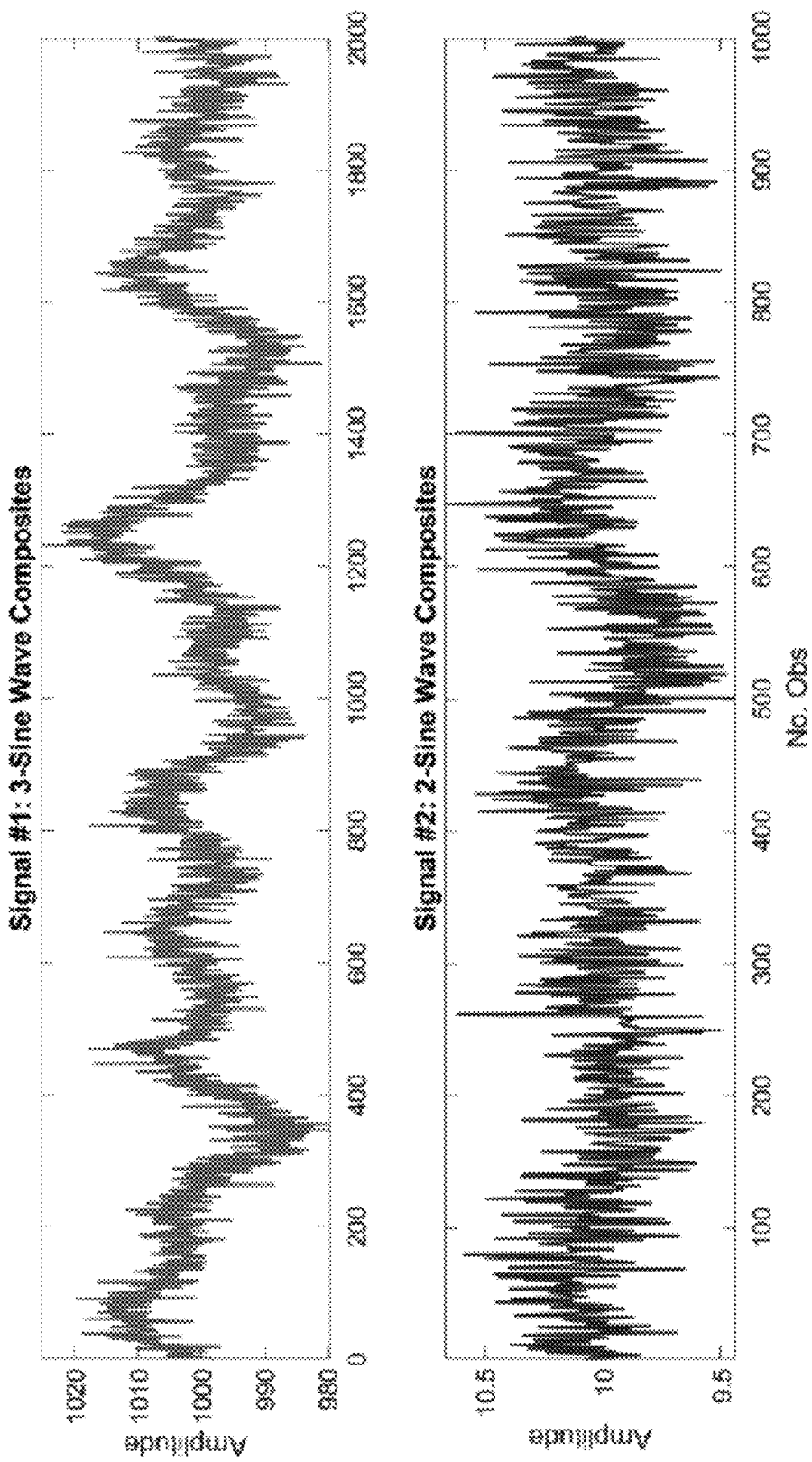
FIG. 4D presents two graphs illustrating the effect of modified mean values applied to the graphs in FIG. 4C in accordance with the disclosed embodiments.
Figure 5:
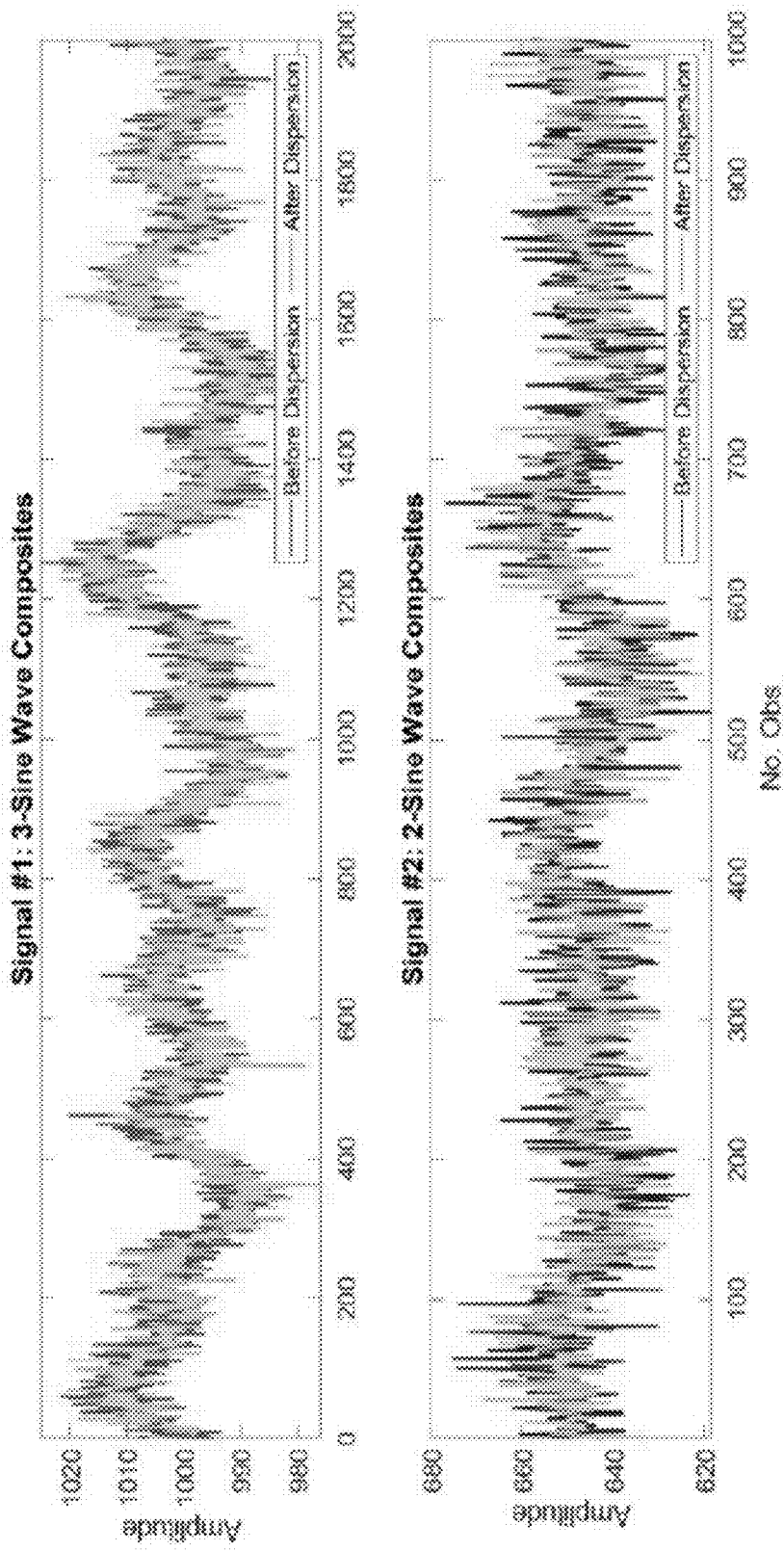
FIG. 5 presents two graphs illustrating the dispersion effect for signal noise standard deviation as applied to the graphs in FIG. 4D in accordance with the disclosed embodiments.

FIGS. 4A-5 illustrate the above-described capabilities in more detail by progressively activating each customizable signal feature. FIG. 4A illustrates two exemplary initial composite sinusoidal signals generated by the SSDP system. Signal #1 includes 2,000 samples and is comprised of three sine waves with periodicities 119, 383, and 587, respectively. Signal #2 includes 1,000 samples and is comprised of two sine waves with periodicities 200 and 300, respectively. For simplicity and clarity, the sampling rate is set to one and the noise ratio is initially set to zero. Next, noise is added to the signals in FIG. 4A to produce the signals that appear in FIG. 4B. Then, the amplitude coefficients for the two signals are altered to produce the signals that appear in FIG. 4C. The mean values for both signals are then modified to produce the signals that appear in FIG. 4D.

Figure 6:
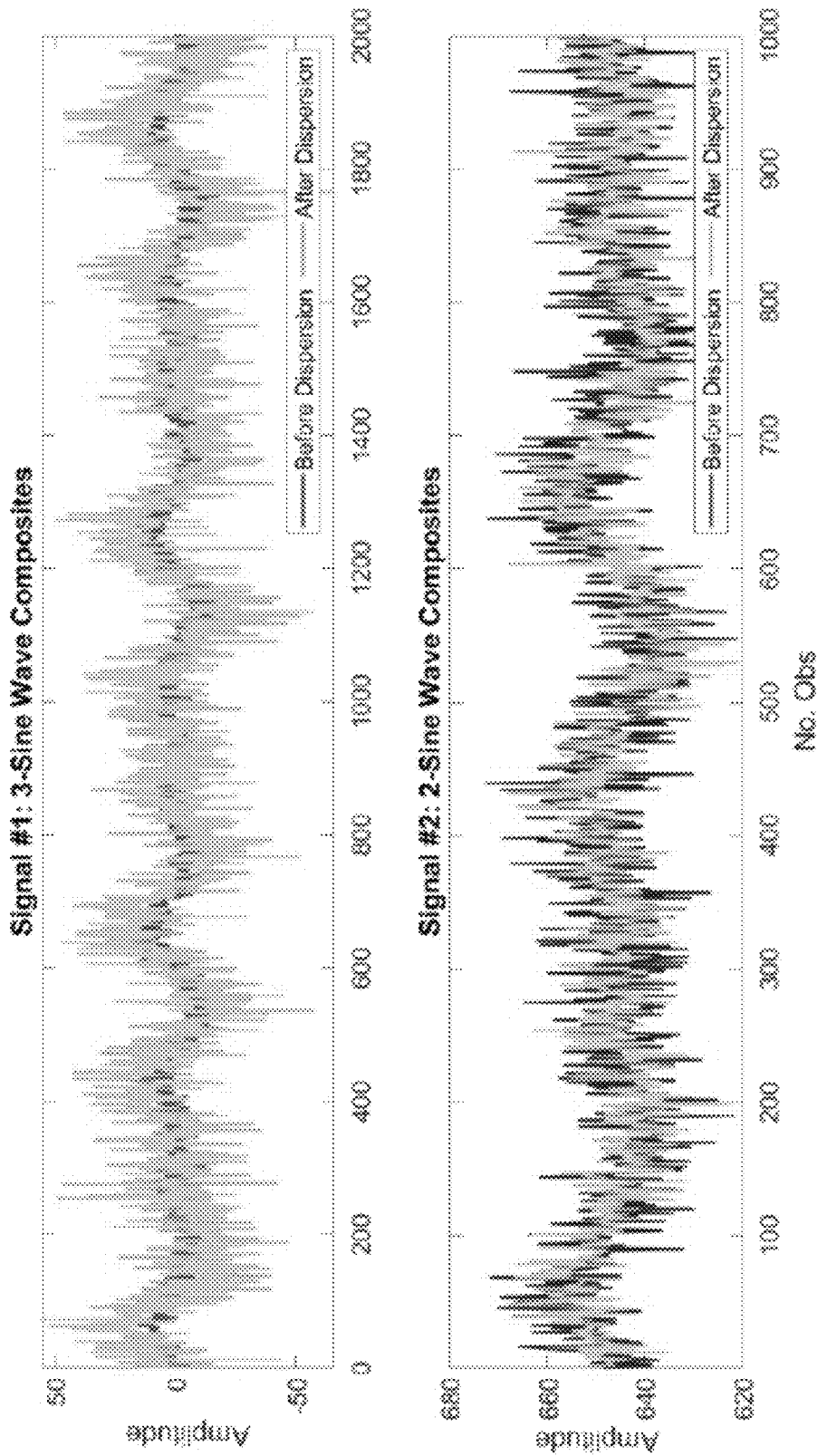
FIG. 6 presents two graphs illustrating the dispersion effect for amplitude values as applied to the graphs in FIG. 4D in accordance with the disclosed embodiments.
Figure 7:
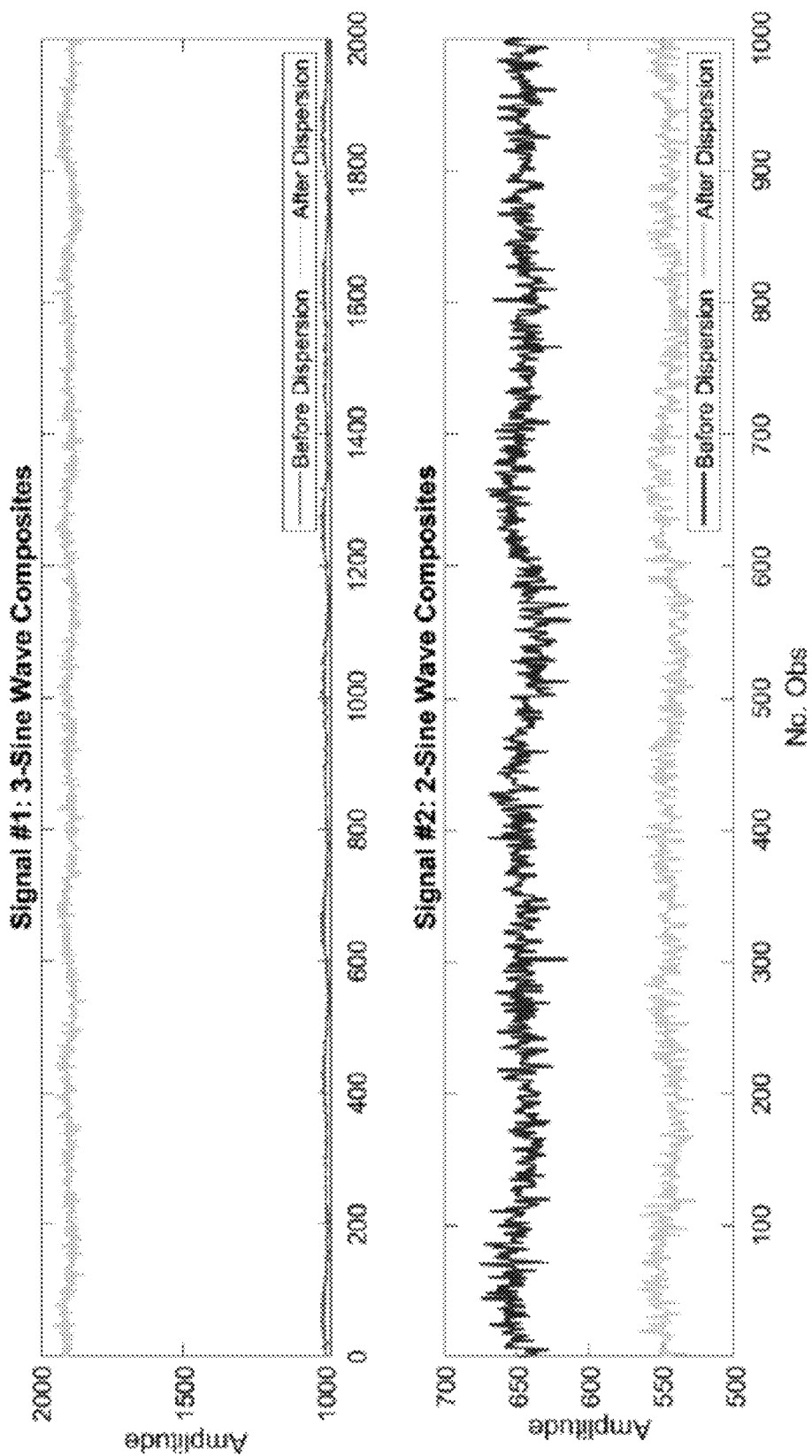
FIG. 7 presents two graphs illustrating the dispersion effect for mean values as applied to the graphs in FIG. 4D in accordance with the disclosed embodiments.
Figure 8:
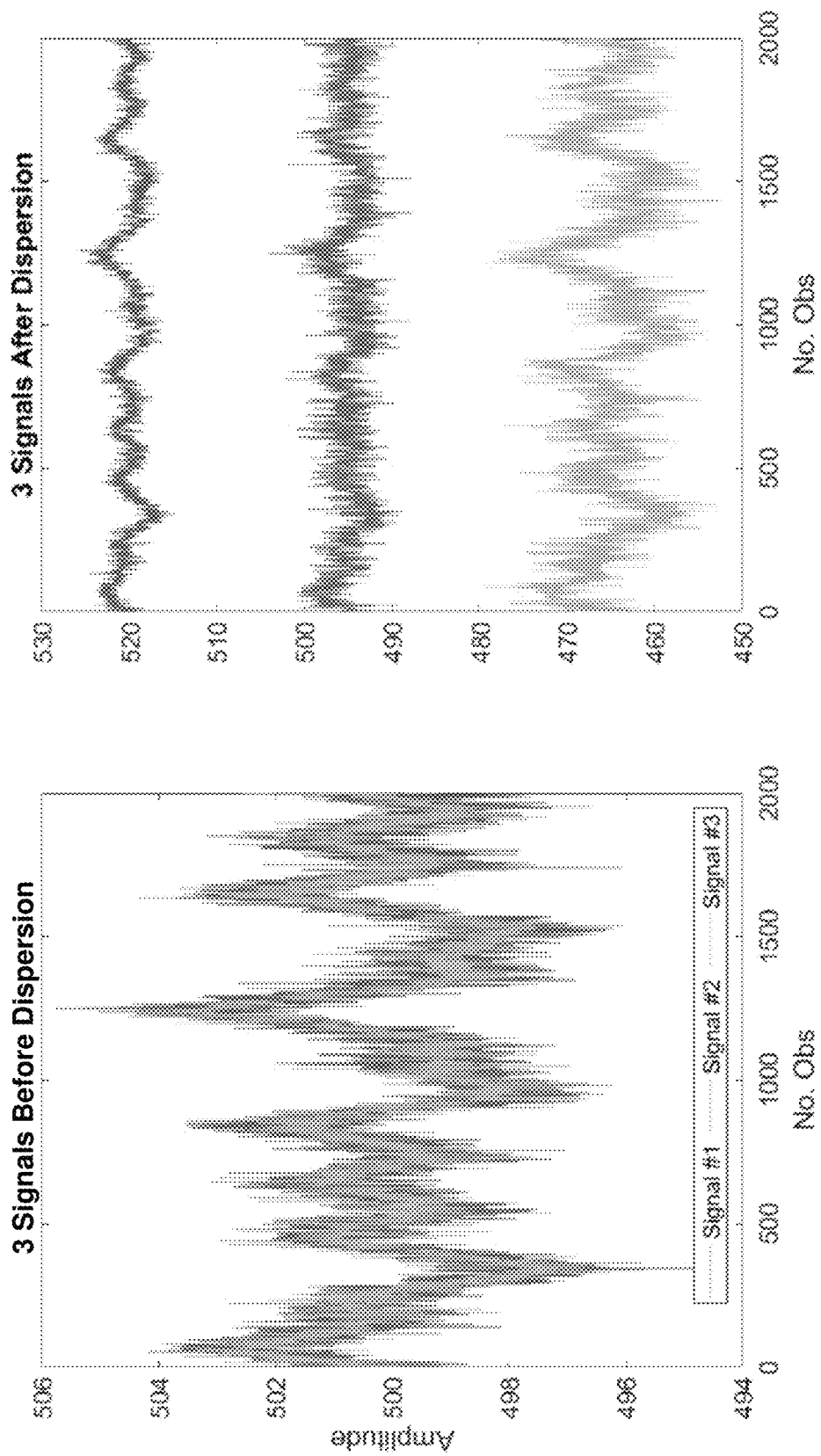
FIG. 8 presents graphs illustrating the effect a dispersion factor has on the spread of a composite signal comprised of three sine waves in accordance with the disclosed embodiments.

Finally, a random dispersion factor is applied to the two signals as is illustrated in FIGS. 5-8. This dispersion factor is used to increase signal variability in a synthetic signal database. In order to mimic realistic measurement variations, the dispersion coefficient is applied to three parameters: (2) standard deviations of signal noise, (2) signal amplitudes, and (3) mean values of signals. By applying dispersion factors to both the standard deviation of signal noise and signal amplitude, a dissimilarity between signals is ensured even when two signal ranges are not unique, as is illustrated in FIGS. 5 and 6. A dispersion factor can also be applied to the mean value parameter, as illustrated in FIG. 7, which increases the spread of a synthetic signals database. To further illustrate the effectiveness of the dispersion scheme, FIG. 8 compares a three-signal database generated without dispersion values against a three-signal database generated with dispersion values.

As mentioned above, a number of customized parameters can be used to produce synthetic signals, which are statistically indistinguishable from real time-series signals, and signal quality parameters can be adjusted to approximate the types of signals seen across a number of important industries.

Another feature of the SSDP system is that it provides a mechanism for selecting any signal quantity and subsequently randomizing associated parameters through a novel "rolling-of-the-die" (ROTD) process. To initialize the ROTD process, the user defines a list of n values for each signal characteristic (noise STD, mean, amplitude, and dispersion). Next, a composite sine wave without any variation (i.e., with no added noise, with a range between −1 and 1, and with mean zero) is generated and the ROTD process is applied to produce a signal with unique values for signal-to-noise ratio, amplitude, and mean.

For example, suppose the user associates all of the signal parameters with arrays that contain five values. First, the system selects the standard deviation value for the added noise by rolling a die with values between one and five to select a random index that is used to select from a list of five user-defined noise values in a noise standard deviation array. Suppose the roll-of-the-die results in a four. In this case, the noise is then generated by using the fourth value from the noise standard deviation array. Next, the system selects an associated dispersion coefficient using the same roll-of-the-die process, and then multiplies the generated noise by the selected dispersion coefficient before adding the noise to the signal.

Figure 9:
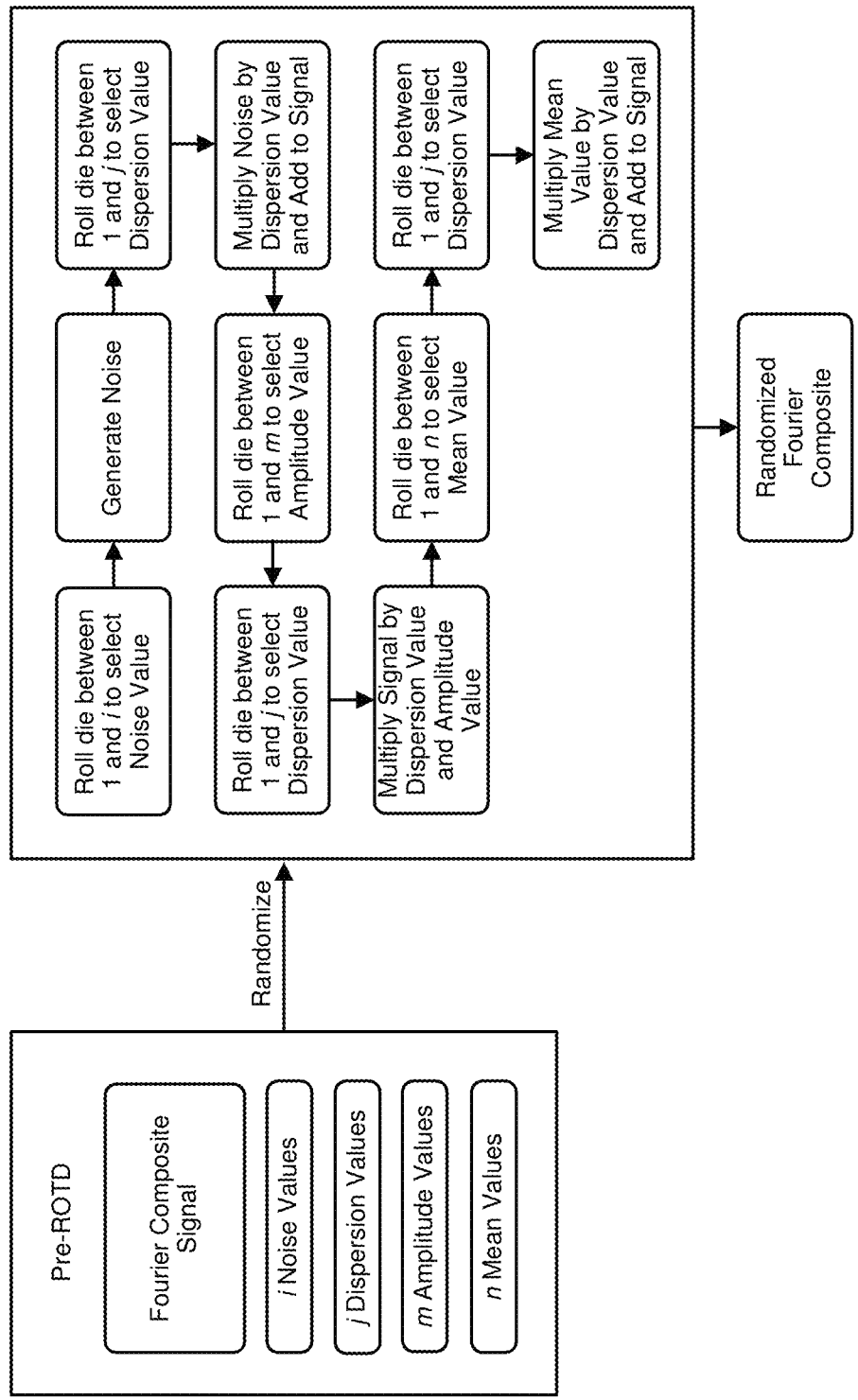
FIG. 9 presents a flow chart illustrating a randomization process that is embedded in a signal synthesizer data pump (SSDP) framework in accordance with the disclosed embodiments.
Figure 10:
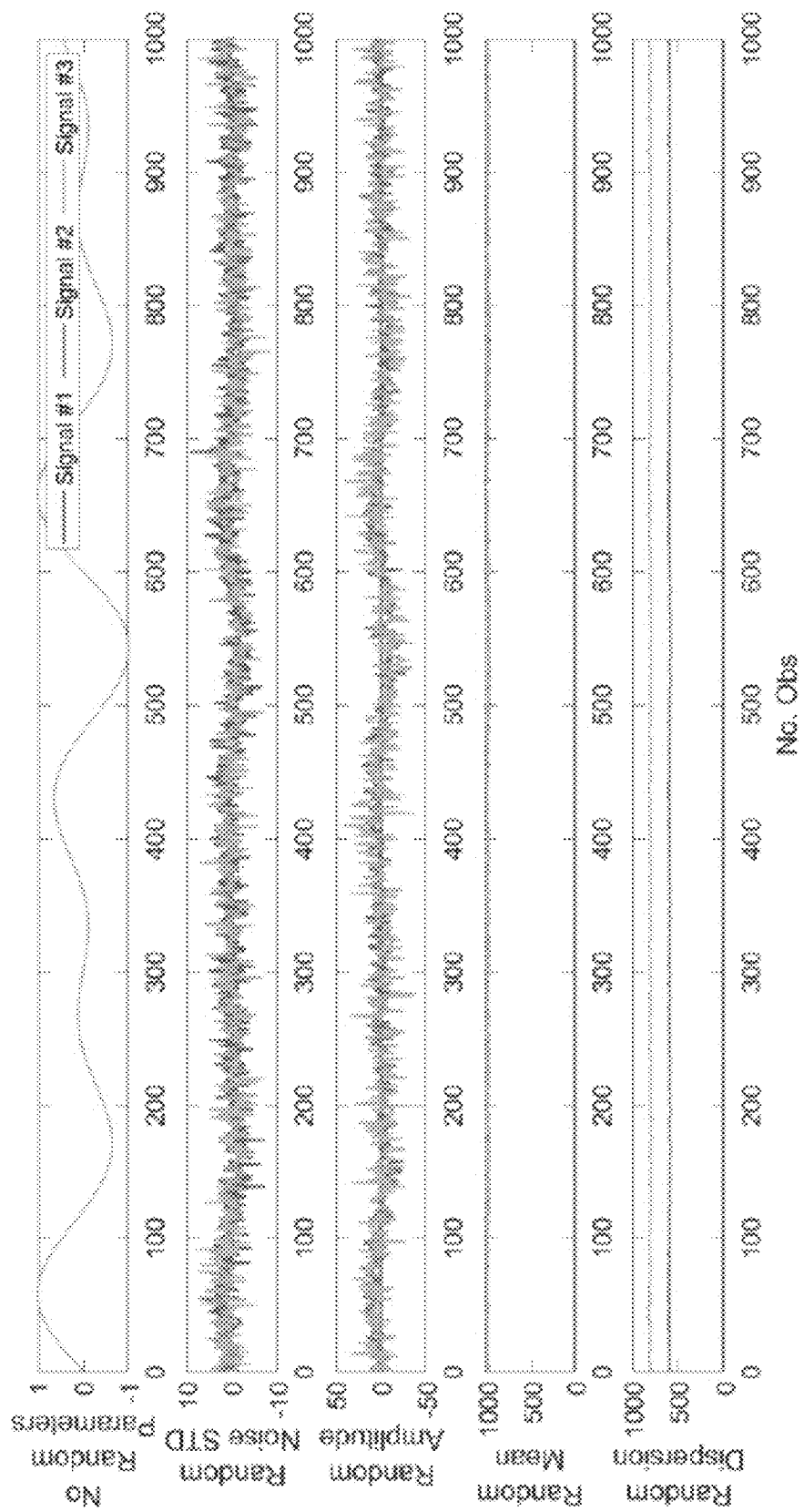
FIG. 10 presents graphs illustrating the application of roll-of-the die parameter randomization in an SSDP framework in accordance with the disclosed embodiments.
Figure 11:
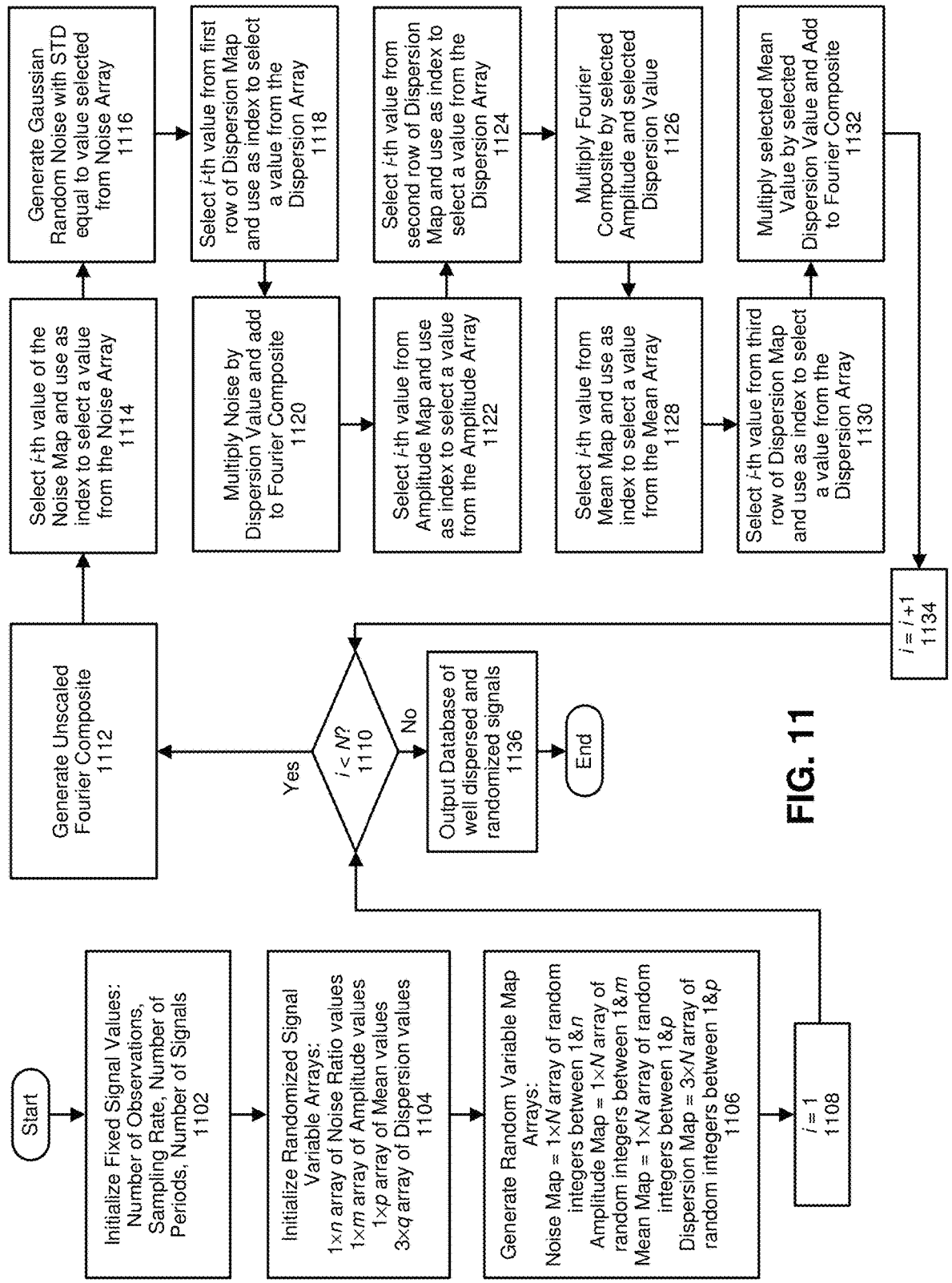
FIG. 11 presents a flow chart illustrating detailed SSDP operations in accordance with the disclosed embodiments.

The remaining signal parameters (mean and amplitude) also have associated dispersion coefficients, which are also selected using the ROTD process. In this example, the signal characteristic arrays are all of length n but the technique can be generalized to accommodate different signal characteristic array lengths for each parameter. For example, suppose the list of amplitude values contains five values, but the user wants the mean values to oscillate between only two different values. In this case, the die roll for the amplitude values would randomly select from a set of five different values, while the die roll for the mean values would randomly select from a set of two different values. FIG. 9 presents a flow chart illustrating the ROTD process, while FIG. 10 presents graphs illustrating how variations can be sequentially inserted into a set of synthetic signals as each parameter is introduced and randomized. FIG. 11 presents a detailed flow chart illustrating SSDP operations.

The SSDP operations of FIG. 11 begin with initializing fixed signal values (operation 1102) such as a number of observations, a sampling rate, a number of periods and a number of signals. Also, randomized signal variable arrays are initialized (operation 1104), including arrays of noise ratio values, amplitude values, mean values, and dispersion values. Next, random variable map arrays are generated (operation 1106), including a noise map, an amplitude map, a mean map, and a dispersion map. Finally, a counter (e.g., integer variable i) is initialized to 1 (operation 1108).

In operation 1110, the counter is compared to a threshold value represented by the variable N. If i<N, the process continues at operation 1112; otherwise, the process advances to operation 1136 to output a database of well-dispersed and randomized signals, after which the process ends.

In operation 1112, an unscaled Fourier composite is generated. The $i^{th}$ value of the noise map is then used as an index to select a value from the noise array (operation 1114), and Gaussian random noise with an STD equal to the value selected from the noise array is generated (operation 1116).

The $i^{th}$ value from the first row of the dispersion map is then used as an index to select a value from the dispersion array (operation 1118), and the noise is multiplied by the selected dispersion value and added to the Fourier composite (operation 1120).

Next, the $i^{th}$ value from the amplitude map is used as an index to select a value from the amplitude array (operation 1122) and the $i^{th}$ value from the second row of the dispersion map is used as an index to select another value from the dispersion array (operation 1124). The Fourier composite is then multiplied by the selected amplitude and the newly selected dispersion value (operation 1126).

Afterward, the $i^{th}$ value from the mean map is used as an index to select a value from the mean array (operation 1128) and the $i^{th}$ value from the third row of the dispersion map is used as an index to select yet another value from the dispersion array (operation 1130), and the selected mean value is multiplied by the selected dispersion value and the result is added to the Fourier composite (operation 1132). In operation 1134, counter i is incremented by 1 and the process returns to operation 1110.

Figure 12:
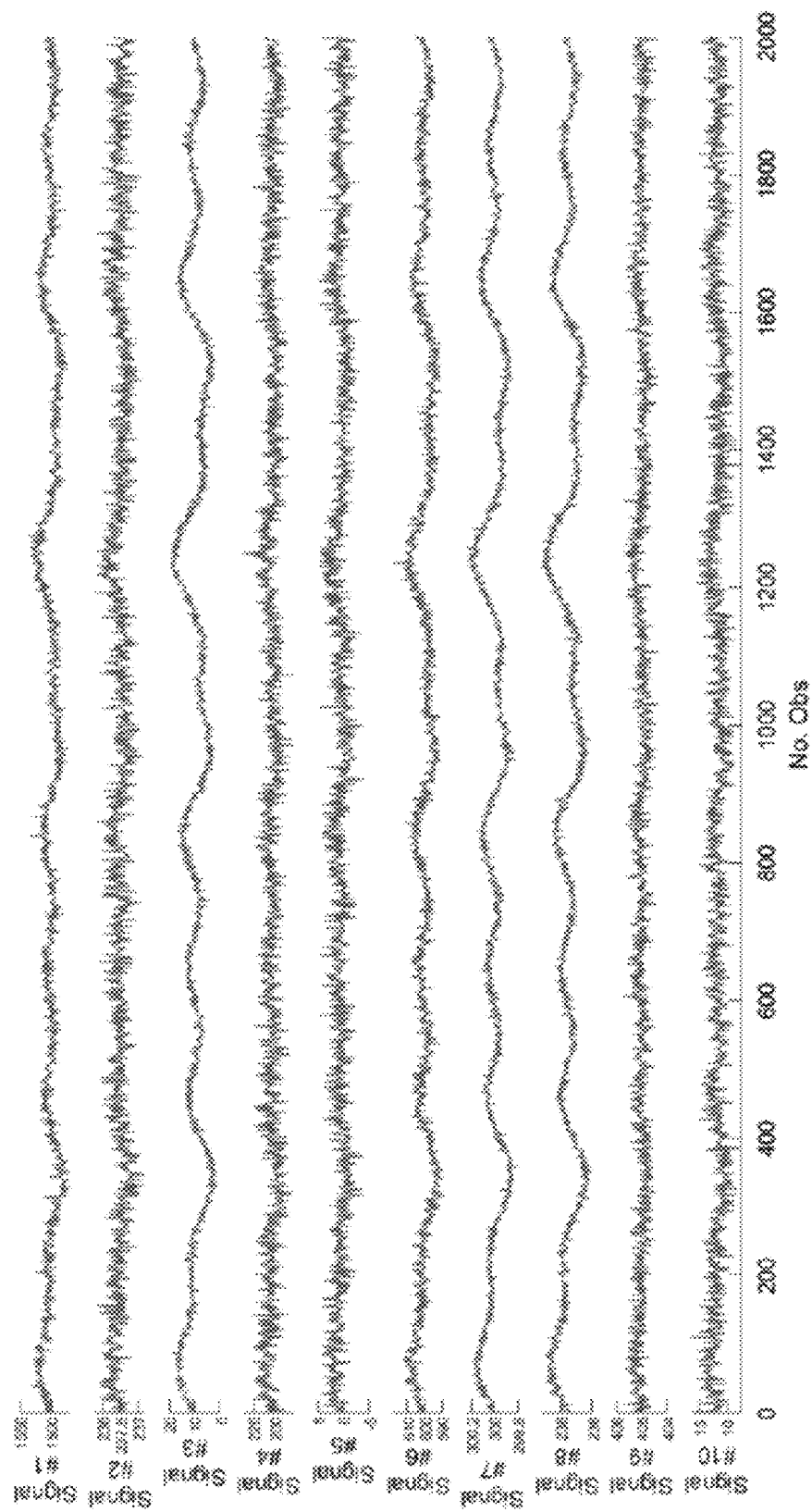
FIG. 12 presents graphs illustrating a 10-signal database of composite sine waves with randomization of parameters for assets in the oil & gas industry in accordance with the disclosed embodiments.
Figure 13:
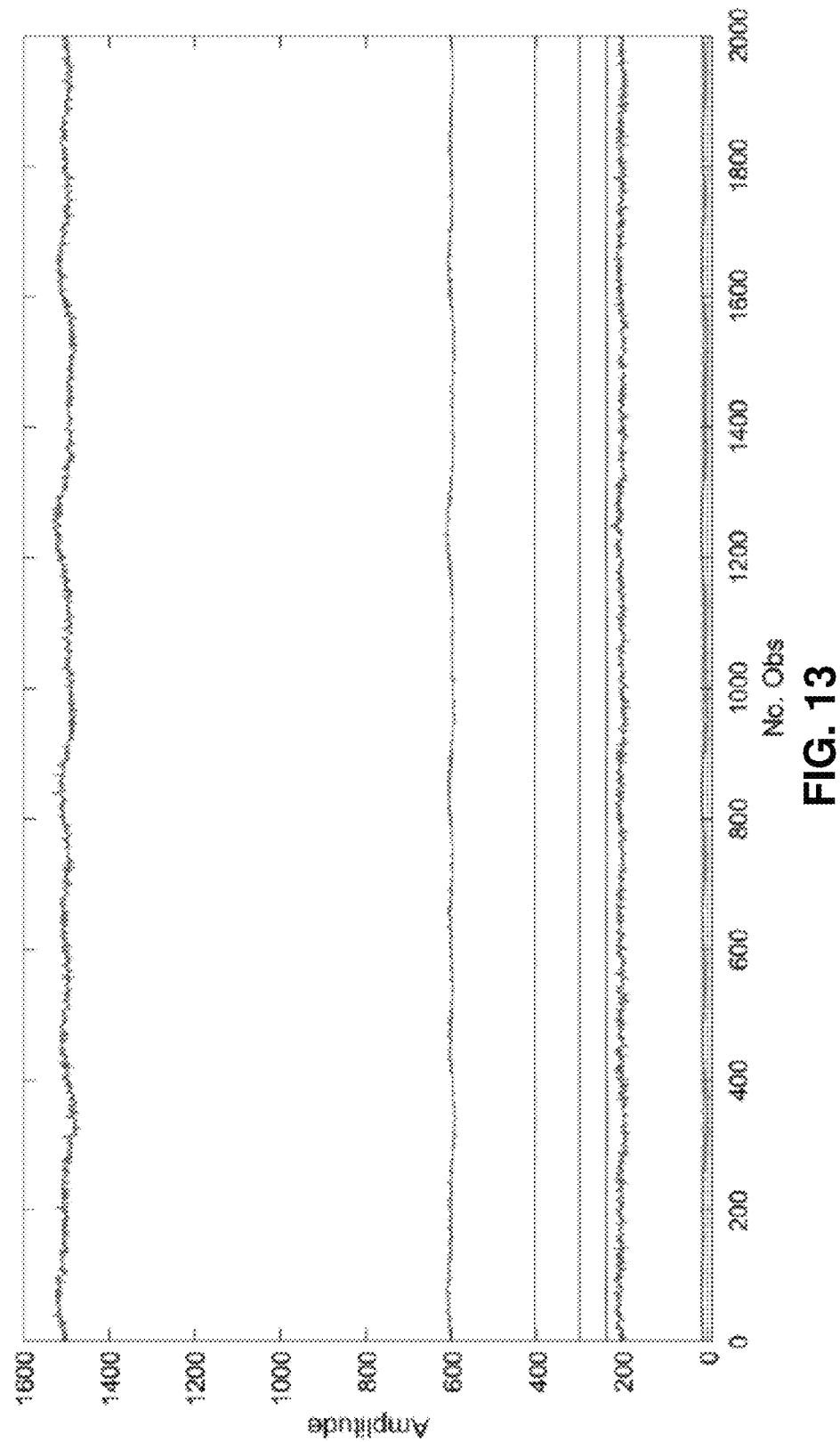
FIG. 13 presents graphs illustrating amplitude values for the 10-signal database of composite sine waves with randomization of parameters for assets in the oil & gas industry in accordance with the disclosed embodiments.

The reason for semi-automating the randomization of the input parameters via the ROTD process (instead of fully automating the process) and generalizing the randomization is to allow the user to tailor a data set for specific use cases while still allowing for a stochastic emulation of measurement variations. For example, if the user wants to optimize a prognostic-surveillance system to detect anomalies in automobile telemetry, the means, ranges, and other signal characteristics will be significantly different than if the user is conducting the same analysis for a large installed-base of smart washing machines. This type of customizable data set construction technique can be applied to any telemetry-dependent industry, such as aviation, utilities, cybersecurity, and data center assets. For example, FIGS. 12 and 13 illustrate an exemplary synthetic signal database for the oil & gas industry including all of the above-described customized parameters.

Figure 14:
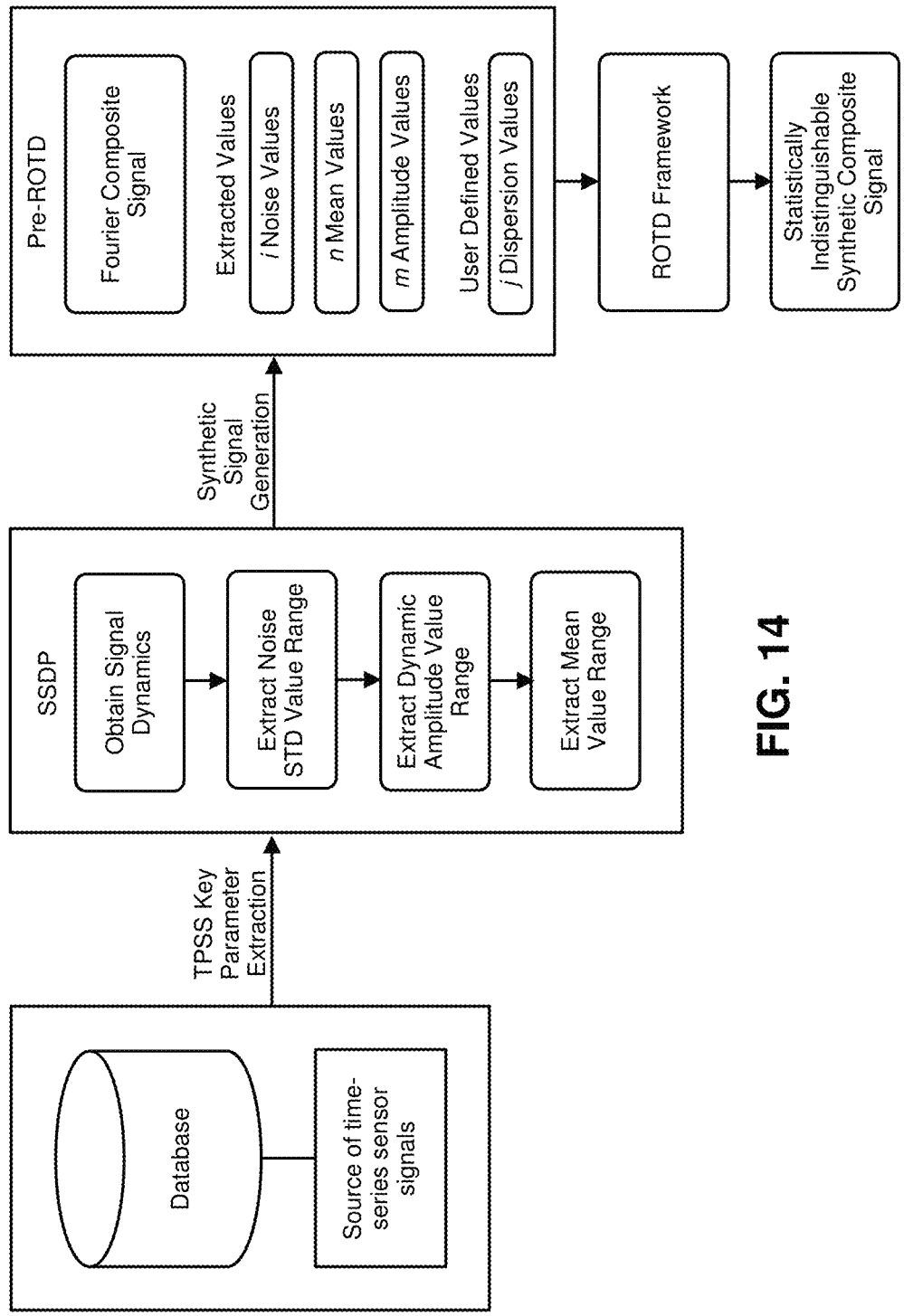
FIG. 14 presents a flow diagram illustrating a randomized-dispersion process embedded in an SSDP framework that performs pre-characterization of industry-specific dynamic and stochastic characteristics and extracts the key characterization parameters in accordance with the disclosed embodiments.
Figure 15:
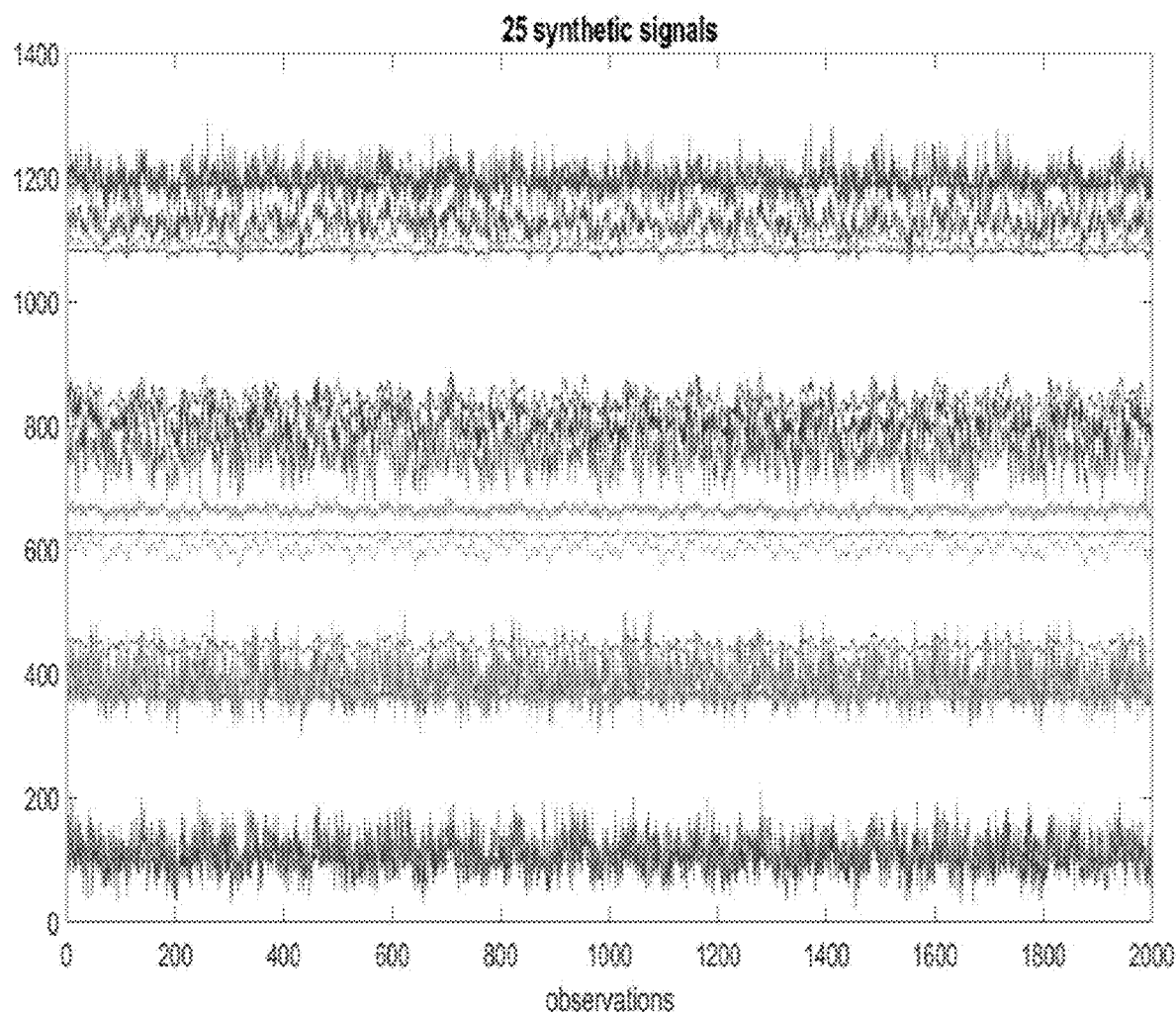
FIG. 15 illustrates 25 synthetic signals generated based on characteristics of a historical database containing real signals with industry-specific parameters in accordance with the disclosed embodiments.

User-defined and custom-tailored data sets are obviously quite valuable. However, the effectiveness of the SSDP system can be further enhanced by combining it with a framework previously developed by the inventors called the "telemetry parameter synthesis system" (TPSS). (See G. C. Wang and K. Gross, "Telemetry Parameter Synthesis System to Support Machine Learning Tuning and Validation," 2018 *International Conference on Computational Science and Computational Intelligence* (CSCI), 2018, pp. 941-946, doi: 10.1109/CSCI46756.2018.00184.) We refer to the combination of the SSDP system and TPSS as the "TPSS key parameter extraction system." Note that for any type of time-series signal, TPSS is able to extract the signal dynamics (serial correlation, cross correlation) and stochastic characteristics (means, variances, skew parameters, kurtosis parameters, spike characterization parameters, and signal quality characteristics, including the prevalence of missing values and/or the quantization of signals). In the combined system, industry-specific parameter characterization can be emulated by extracting "key parameter formula arrays" for the SSDP system and subsequently passing the arrays through the ROTD randomized dispersion process of the SSDP system. In this way, it is possible to generate many hours of high-fidelity synthesized telemetry signals for any given industry, wherein the synthesized signals have no statistically discernible differences from real telemetry signals obtained from real monitored assets. FIG. 14 illustrates a high-level workflow of the TPSS key parameter extraction system, while FIG. 15 illustrates a resulting library of signals generated based on parameters from a historical data set.

Process of Producing Synthetic Signals

Figure 16:
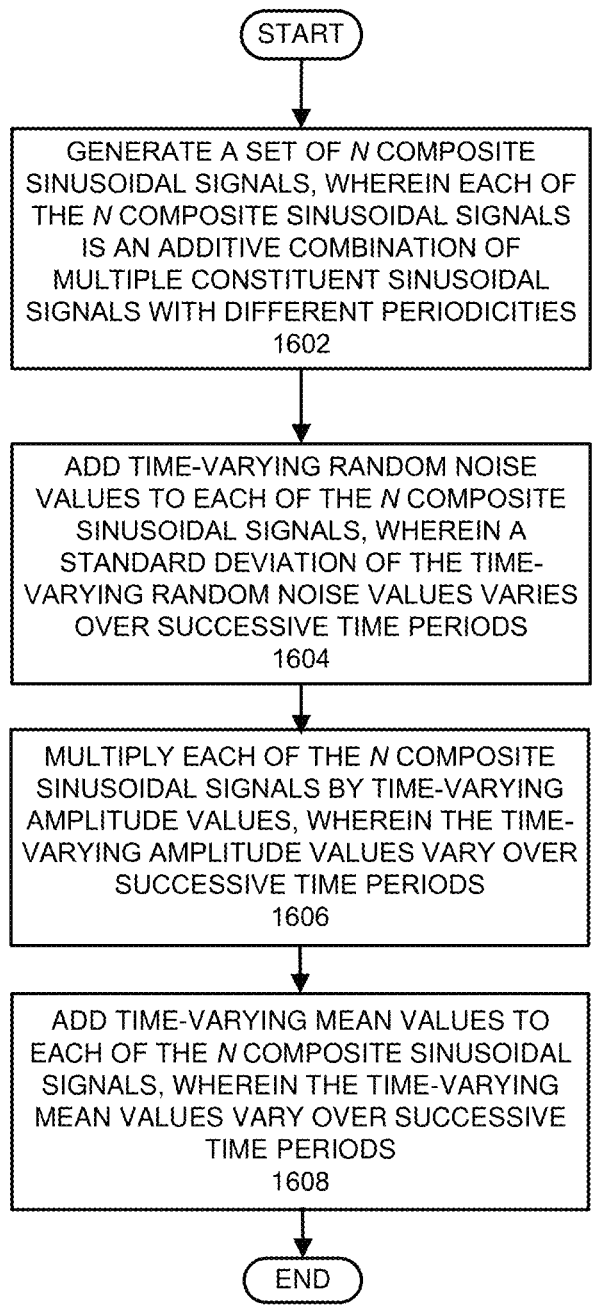
FIG. 16 presents a flow chart illustrating a process for producing synthetic signals in accordance with the disclosed embodiments.

FIG. 16 presents a flow chart illustrating a process for producing synthetic signals in accordance with the disclosed embodiments. During operation, the system generates a set of N composite sinusoidal signals, wherein each of the N composite sinusoidal signals is an additive combination of multiple constituent sinusoidal signals with different periodicities (step 1602). Next, the system adds time-varying random noise values to each of the N composite sinusoidal signals, wherein a standard deviation of the time-varying random noise values varies over successive time periods (step 1604). The system also multiplies each of the N composite sinusoidal signals by time-varying amplitude values, wherein the time-varying amplitude values vary over successive time periods (step 1606). Finally, the system adds time-varying mean values to each of the N composite sinusoidal signals, wherein the time-varying mean values vary over successive time periods (step 1608).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for producing synthetic signals for testing machine-learning systems, comprising:
   generating a set of N composite sinusoidal signals, wherein each of the N composite sinusoidal signals is an additive combination of multiple constituent sinusoidal signals with different periodicities;
   adding time-varying random noise values to each of the N composite sinusoidal signals, wherein a standard deviation of the time-varying random noise values varies over successive time periods;
   multiplying each of the N composite sinusoidal signals by time-varying amplitude values, wherein the time-varying amplitude values vary over successive time periods; and
   adding time-varying mean values to each of the N composite sinusoidal signals, wherein the time-varying mean values vary over successive time periods.

2. The method of claim 1, wherein generating the N composite sinusoidal signals comprises:
   receiving composite signal parameters from a user, wherein the composite signal parameters specify: a desired number of composite sinusoidal signals N, and periodicities for the constituent sinusoidal signals that are combined to produce the N composite sinusoidal signals; and
   using the composite signal parameters to generate the N composite sinusoidal signals.

3. The method of claim 1, wherein the time-varying random noise values, amplitude values and mean values are selected through a roll-of-the-die process from a library of common values, which are learned from industry-specific signals.

4. The method of claim 1, wherein the method further comprises producing the time-varying random noise values for each successive time period by iteratively:
   using a roll-of-the-die process to randomly select a standard deviation for the noise value from among n user-specified standard deviation values;

generating Gaussian noise with a standard deviation equal to the selected standard deviation;

using a roll-of-the-die process to randomly select a dispersion value from among q user-specified dispersion values; and multiplying the generated Gaussian noise by the selected dispersion value to produce random noise for the time period.

5. The method of claim 1, wherein the method further comprises producing the time-varying amplitude values for each successive time period by iteratively:

using a roll-of-the-die process to randomly select an amplitude value from among m user-specified amplitude values;

using a roll-of-the-die process to randomly select a dispersion value from among q user-specified dispersion values; and multiplying the selected amplitude value by the selected dispersion value to produce an amplitude value for the time period.

6. The method of claim 1, wherein the method further comprises producing the time-varying mean values for each successive time period by iteratively:

using a roll-of-the-die process to randomly select a mean value from among m user-specified mean values;

using a roll-of-the-die process to randomly select a dispersion value from among q user-specified dispersion values; and multiplying the selected mean value by the selected dispersion value to produce a mean value for the time period.

7. The method of claim 1, wherein the method further comprises using the set of N composite sinusoidal signals to test a machine-learning system that performs prognostic-surveillance operations on a monitored system.

8. The method of claim 7, wherein testing the machine-learning system comprises:

forming a training data set from a first section of the set of N composite sinusoidal signals;

forming a surveillance data set from a second section of the set of N composite sinusoidal signals;

during a training mode, using the training data set to train an inferential model; and during a surveillance mode:
using the trained inferential model to generate estimated values for time-series signals in the surveillance data set based on cross-correlations between time-series signals in the surveillance data set, performing pairwise differencing operations between actual values and the estimated values for the time-series signals in the surveillance data set to produce residuals, and analyzing the residuals to detect the incipient anomalies in the monitored system.

9. The method of claim 8, wherein analyzing the residuals involves:

performing a sequential probability ratio test (SPRT) on the residuals to produce SPRT alarms; and detecting the incipient anomalies based on the SPRT alarms.

10. The method of claim 1, wherein prior to generating the set of N composite sinusoidal signals, the method further comprises:

receiving a set of N time-series sensor signals from a monitored system;

extracting parameters from the N time-series sensor signals, wherein the extracted parameters can include:

signal dynamics parameters, including serial correlations and cross-correlations, stochastic characteristic parameters, such as means, variances, skew parameters, kurtosis parameters, spike characteristics and signal quality characteristics, a standard deviation value range for signal noise, an amplitude value range, and a mean value range; and using the extracted parameters while performing the method for producing synthetic signals.

11. A non-transitory computer-readable storage medium storing instructions that when executed by a computer cause the computer to perform a method for producing synthetic signals for testing machine-learning systems, the method comprising:

generating a set of N composite sinusoidal signals, wherein each of the N composite sinusoidal signals is an additive combination of multiple constituent sinusoidal signals with different periodicities;

adding time-varying random noise values to each of the N composite sinusoidal signals, wherein a standard deviation of the time-varying random noise values varies over successive time periods;

multiplying each of the N composite sinusoidal signals by time-varying amplitude values, wherein the time-varying amplitude values vary over successive time periods; and adding time-varying mean values to each of the N composite sinusoidal signals, wherein the time-varying mean values vary over successive time periods.

12. The non-transitory computer-readable storage medium of claim 11, wherein the time-varying random noise values, amplitude values and mean values are selected through a roll-of-the-die process from a library of common values, which are learned from industry-specific signals.

13. The non-transitory computer-readable storage medium of claim 11, wherein the method further comprises producing the time-varying random noise values for each successive time period by iteratively:

using a roll-of-the-die process to randomly select a standard deviation for the noise value from among n user-specified standard deviation values;

generating Gaussian noise with a standard deviation equal to the selected standard deviation;

using a roll-of-the-die process to randomly select a dispersion value from among q user-specified dispersion values; and multiplying the generated Gaussian noise by the selected dispersion value to produce random noise for the time period.

14. The non-transitory computer-readable storage medium of claim 11, wherein the method further comprises producing the time-varying amplitude values for each successive time period by iteratively:

using a roll-of-the-die process to randomly select an amplitude value from among m user-specified amplitude values;

using a roll-of-the-die process to randomly select a dispersion value from among q user-specified dispersion values; and multiplying the selected amplitude value by the selected dispersion value to produce an amplitude value for the time period.

15. The non-transitory computer-readable storage medium of claim 11, wherein the method further comprises producing the time-varying mean values for each successive time period by iteratively:
  using a roll-of-the-die process to randomly select a mean value from among m user-specified mean values;
  using a roll-of-the-die process to randomly select a dispersion value from among q user-specified dispersion values; and
  multiplying the selected mean value by the selected dispersion value to produce a mean value for the time period.

16. The non-transitory computer-readable storage medium of claim 11, wherein the method further comprises using the set of N composite sinusoidal signals to test a machine-learning system that performs prognostic-surveillance operations on a monitored system.

17. The non-transitory computer-readable storage medium of claim 16, wherein testing the machine-learning system comprises:
  forming a training data set from a first section of the set of N composite sinusoidal signals;
  forming a surveillance data set from a second section of the set of N composite sinusoidal signals;
  during a training mode, using the training data set to train an inferential model; and
  during a surveillance mode:
    using the trained inferential model to generate estimated values for time-series signals in the surveillance data set based on cross-correlations between time-series signals in the surveillance data set,
    performing pairwise differencing operations between actual values and the estimated values for the time-series signals in the surveillance data set to produce residuals, and analyzing the residuals to detect the incipient anomalies in the monitored system.

18. The non-transitory computer-readable storage medium of claim 11, wherein prior to generating the set of N composite sinusoidal signals, the method further comprises:
  receiving a set of N time-series sensor signals from a monitored system;
  extracting parameters from the N time-series sensor signals, wherein the extracted parameters can include:
    signal dynamics parameters, including serial correlations and cross-correlations,
    stochastic characteristic parameters, such as means, variances, skew parameters, kurtosis parameters, spike characteristics and signal quality characteristics,
    a standard deviation value range for signal noise,
    an amplitude value range, and
    a mean value range; and
  using the extracted parameters while performing the method for producing synthetic signals.

19. A system that produces synthetic signals for testing machine-learning systems, comprising:
  a computing system with one or more processors and one or more associated memories; and
  program code that executes on the computing system, wherein during operation, the program code:
    generates a set of N composite sinusoidal signals, wherein each of the N composite sinusoidal signals is an additive combination of multiple constituent sinusoidal signals with different periodicities;
    adds time-varying random noise values to each of the N composite sinusoidal signals, wherein a standard deviation of the time-varying random noise values varies over successive time periods;
    multiplies each of the N composite sinusoidal signals by time-varying amplitude values, wherein the time-varying amplitude values vary over successive time periods; and
    adds time-varying mean values to each of the N composite sinusoidal signals, wherein the time-varying mean values vary over successive time periods.

20. The system of claim 19, wherein the program code additionally uses the set of N composite sinusoidal signals to test a machine-learning system that performs prognostic-surveillance operations on a monitored system.

* * * * *